UNITED STATES PATENT OFFICE.

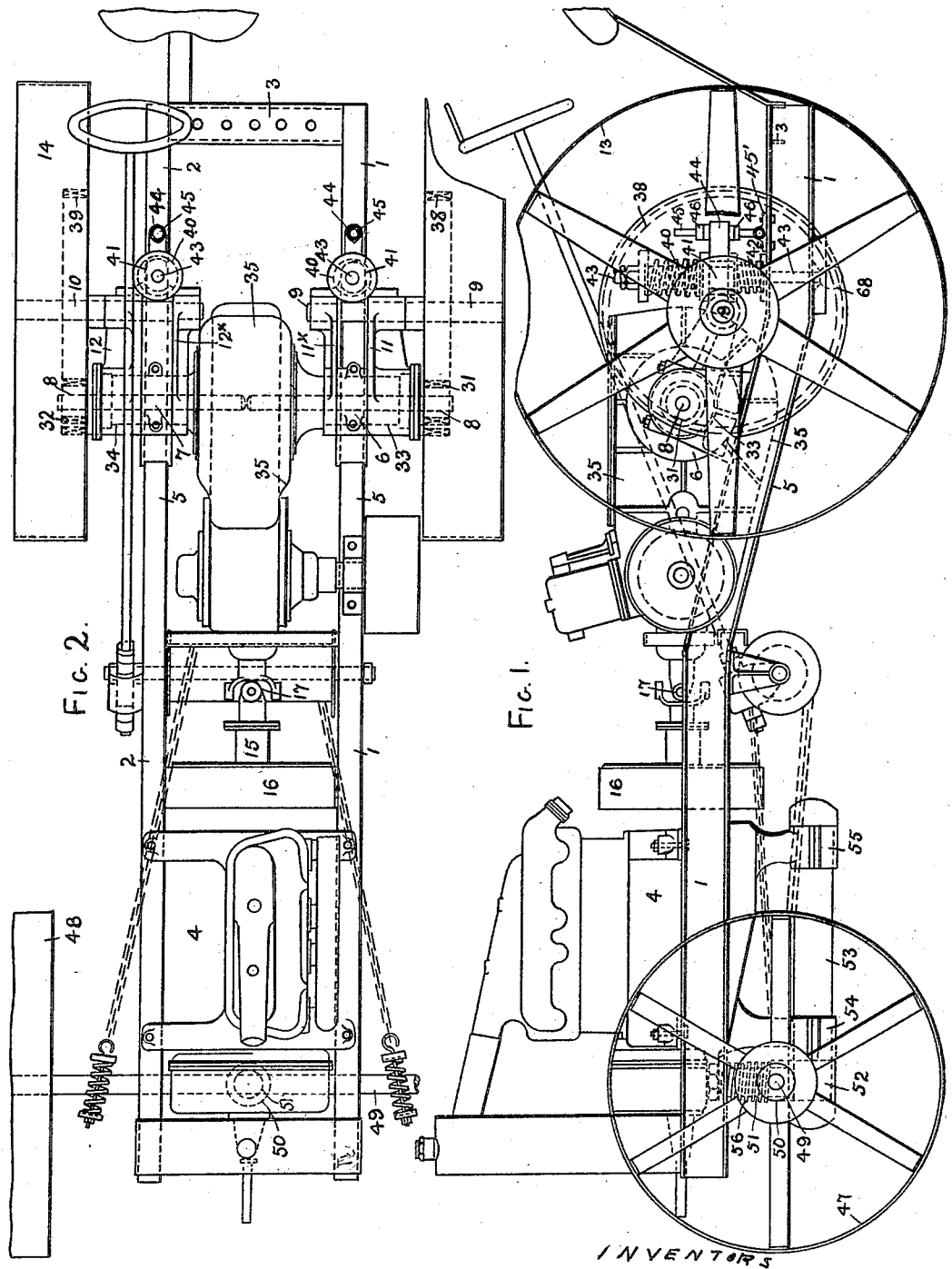

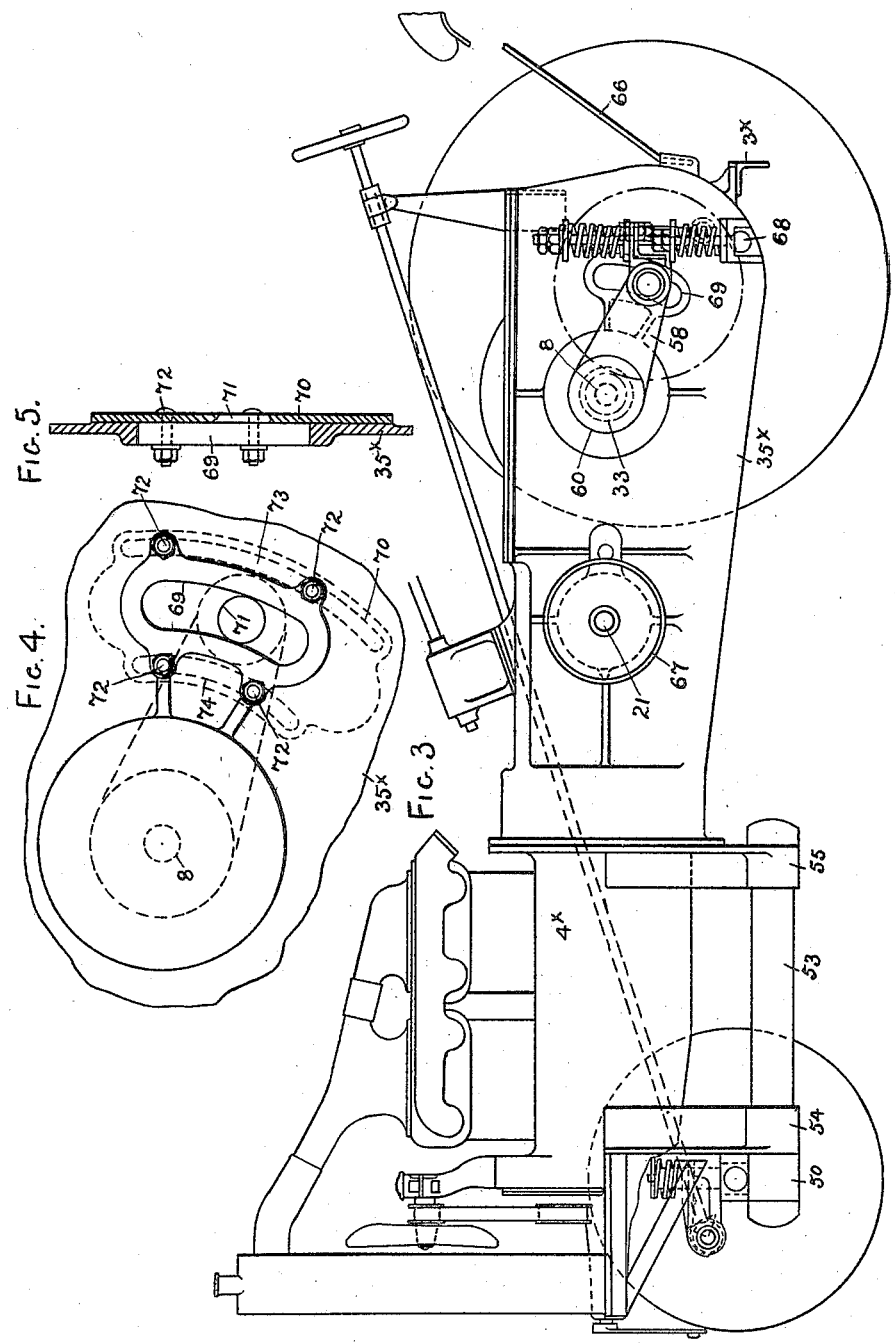

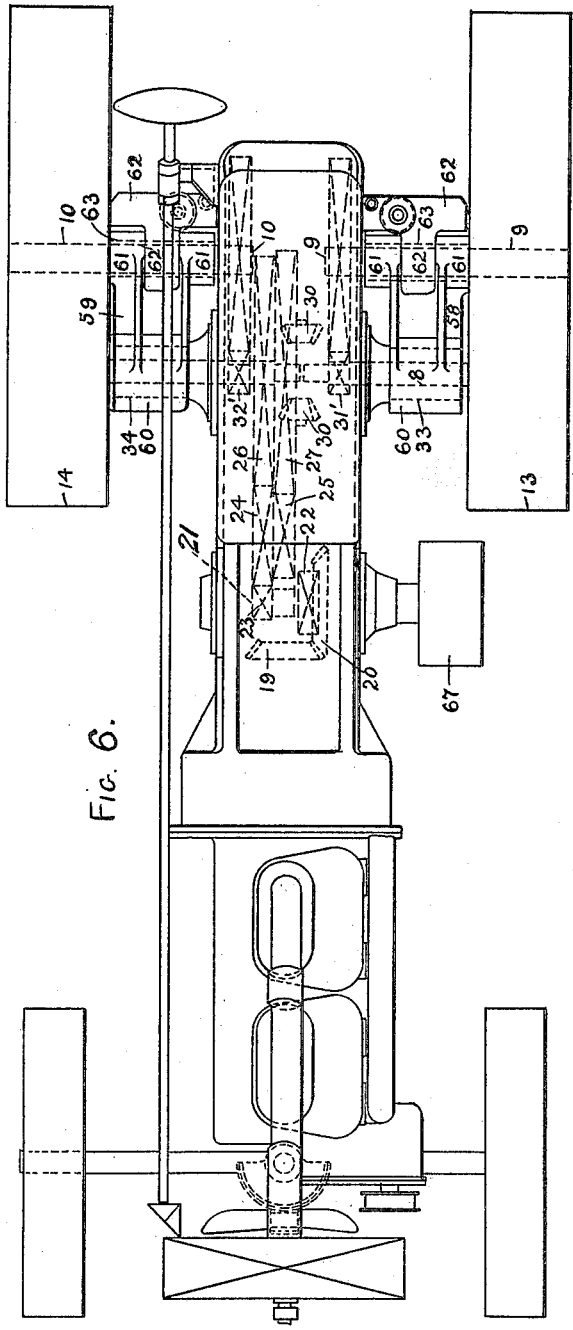
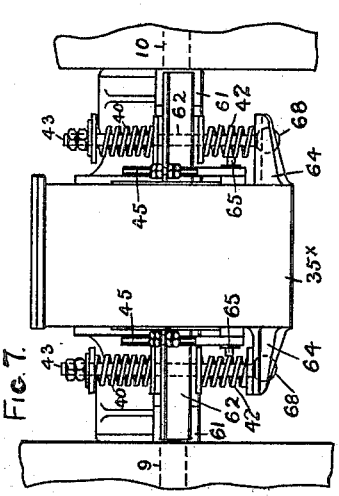
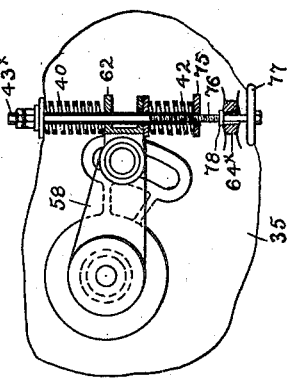

JOSEPH BAMFORD AND CYRIL JOSEPH BAMFORD, OF UTTOXETER, ENGLAND.

MOTOR-TRACTOR.

1,384,986. Specification of Letters Patent. Patented July 19, 1921.

Application filed August 13, 1918. Serial No. 249,621.

*To all whom it may concern:*

Be it known that we, JOSEPH BAMFORD and CYRIL JOSEPH BAMFORD, subjects of His Majesty the King of Great Britain and Ireland, residing at St. Mary's Mount, Uttoxeter, and The Parks, Uttoxeter, England, respectively, have invented new and useful Improvements in Motor-Tractors, of which the following is a specification.

This invention has reference to motor tractors of the kind which are adapted more particularly for hauling plows and other agricultural machines and for hauling vehicles. Our invention has reference more particularly to improved means for mounting and springing the two motor driven road wheels of such motor tractor and in combination with such means our invention further comprises improvements in the construction and arrangement of the framework supported by the road wheels and further the general construction of the motor tractor so as to form a simple and complete motor tractor which will stand rough usage and can be easily manipulated, and in which the center of gravity will be low so as to increase its stability on hill sides.

According to this invention each of the two motor driven road wheels is mounted to revolve independently on or with its own short stub axle, which stub axles are independent of one another and each is carried by a corresponding radial arm or arms which is or are adapted to turn about the center of the transverse transmission shaft the ends of the transmission shaft being geared to the two road wheels. The said radial arms are arranged inside the tractor frame work or are arranged both inside and outside such framework or, when the tractor is made without any frame-work then the radial arms are arranged to turn on bosses on the sides of the tractor casing, which carries the bearings of the transverse transmission shaft. The said radial arm or radial arms is or are connected through springs to the tractor framework or casing which carries the bearing blocks or the like of the transverse transmission shaft, said springs maintaining the relative height of the driving wheels to the framework or casing substantially constant, and said arm or arms is or are also so constructed and combined with their stub axles and the parts on which the arm or arms is or are mounted, that, although the stub axles with their arm or arms are capable of certain limited small up and down movements against the springs in arcs of which the transverse transmission shaft is the center, yet without the employment of any guides for the said radial arm or arms (although such guides may be added if desired) any distortion of the stub axles and the arms is effectually prevented. Means are provided for locking the radial arms to the framework or casing when it is desired to render the springs inoperative, and in some cases we also provide means for temporarily setting one road wheel and its adjuncts higher than the other road wheel and its adjuncts.

On the accompanying drawings,

Figure 1 is a side elevation of one arrangement of motor tractor constructed in accordance with this invention;

Fig. 2 is a plan of the same;

Fig. 3 is a side elevation of another arrangement of motor tractor constructed in accordance with this invention;

Fig. 4 is a side elevation of a portion of the same to illustrate means for mounting a cover plate on the side of the casing;

Fig. 5 is a sectional elevation through the cover plate taken at right angles to Fig. 4;

Fig. 6 is a plan of the motor tractor illustrated by Figs. 3, 4, and 5;

Fig. 7 is an end elevation of parts of the same to illustrate the means for springing the wheels and axles, and Fig. 8 is a side elevation of an alternative arrangement of the springs and means for setting one road wheel higher than the other.

We will first describe the arrangement of our invention illustrated by Figs. 1 and 2.

In this arrangement of carrying out our invention we provide a framework or chassis consisting of two girder sides marked respectively 1, 2, fixed at the proper distance apart as by the back end beam 3 forming the draw bar and by a front cross girder not shown on this drawing, these girder sides 1, 2, at the front part carrying the engine 4 and toward the rear at 5 being swept downwardly underneath the bearing blocks 6, 7, of the transverse transmission shaft 8 and under the stub axles 9, 10, and radial arms 11, 11$^x$ and 12, 12$^x$ of the driven road wheels 13, 14, thus providing clearance for said raidal arms and stub axles 9, 10, and giving a low center of gravity to the complete machine making it thereby more stable on hillsides than is usual in this class of motor tractor.

The transmission gear from the engine 4 to the transverse transmission shaft 8 is arranged at the rear of the engine and is driven by the central shaft 15 of the same through a suitable friction clutch 16 with universal joint 17 interposed between the short shaft of the transmission gear and the clutch 16 to allow for any distortion of the longitudinal center line of the two portions of the shaft which may occur. Any suitable transmission gear may be employed to drive the transverse transmission shaft 8 from the central longitudinal shaft 15 but preferably a transmission gear of a known kind which gives one or more speeds forward and a reverse. The transverse transmission shaft 8 is mounted to revolve in and projects through laterally projecting tubular sleeves or bearings 33, 34, rigidly fixed to the casing 35 which incloses the transmission gearing. The casing of the transmission gearing is fixed to the side girders 1, 2, of the chassis or framework by bearing blocks 6, 7, in which the lateral projecting tubular sleeves 33, 34, of the transmission gear casing are fixed, these bearing blocks 6, 7, being bolted or otherwise fixed on to the side girders 1, 2, of the frame work. The ends of the transmission shaft 8 project beyond these tubular sleeves or bearings and carry the pinions 31, 32 of the driving gear of the road wheels 13, 14. The radial arm or arms carrying the stub axles 9, 10 are mounted on the sleeves or bearings 33, 34, of the transverse transmission shaft, or they may be mounted on concentric bosses of the bearing blocks 6, 7, and preferably each stub axle is furnished with two radial arms marked respectively 11, $11^x$ and 12, $12^x$ disposed at the sides of the corresponding bearing block, as shown in Fig. 2, the outer ends of these radial arms 11, $11^x$ being fixed together by the stub axle 9 which is fixed to them and the outer ends of the other radial arms 12, $12^x$ being similarly fixed together by the stub axle 10 which is fixed in them, and thus by employing a pair of radial arms for each stub axle with the bearing blocks 6, 7, between them a long support for each of the stub axles is formed and as the bosses of the two radial arms 11, $11^x$, form a long bearing on the sleeve 33 of the transmission gear casing or on the bosses of the bearing block 6, and as the two radial arms 12, $12^x$ similarly form a long bearing on the sleeve 34 of the transmission gear casing or on the corresponding bearing block 7 of the same any distortion of either of the stub axles by the side strains of the road wheels 13, 14 is effectually prevented without employing any guides for the stub axles or for the radial arms, although such guides may be added if desired.

As a modification, instead of each stub axle being carried by two radial arms as above described, arranged inside and outside the framework as in Figs. 1 and 2 the outer radial arms 11, 12, may be dispensed with and each stub axle be carried by only one radial arm arranged between the bearing block on the framework and the casing of the transmission gear. The pinions 31, 32 on the ends of the transverse transmission shaft 8 gear with internally toothed rings 38, 39, fixed respectively on the road wheels 13, 14, and within the face of the same; or any other arrangement of gearing for transmitting the rotary motion from the transverse transmission shaft 8 to the road wheels may be employed as will be readily understood. Also any suitable means may be employed for adjusting the mesh of the driving gear if such adjustment is necessary.

The springs through which the radial arms 11, $11^x$ and 12, $12^x$ are connected to the side frames 1, 2 of the machine preferably consist of an arrangement for each stub axle and radial arm or radial arms of two compression springs one of which marked 40 is arranged above the rearwardly projecting eye part 41 of the arms and another coiled compression spring 42 is arranged below the said eye part with a swiveling connecting bolt 43 passing through these springs and eyes and through a hole in the girder frame with washers interposed between the ends of the spring and the frame and the ends of the spring and the eye piece so that the rear portion of the framework is thus supported by the bolts 43 and springs from the radial arms. The bolt 43 swivels about its lower end 68 to accommodate itself to the movements of the stub axles and radial arms.

Or as a modification the radial arms may be extended at the front of the axis of the transverse shaft 8 forming the pivot center and the springing applied at these extended ends as well as or instead of at the rear ends which carry the stub axles.

In order to lock the radial arms and the stub axles to the framework and render the springs inoperative when desired the arms may be made with backwardly projecting eye parts 44 through which pass upright bolts or the like 45 bent at right angles at their lower ends and pivotally connected to small bearing blocks 45′ secured to the side frames 1, 2, and to which the radial arms can thus be locked as by nuts 46 on the bolts 45.

As the road wheels 13, 14, are outside the frame work of the machine it is a simple matter to fix on them extension rims when it is desired to increase the faces of the road wheels to suit soft land.

The two front steering wheels 47, 48, are preferably mounted on a swivel axle 49 which is made with a central vertical eye 50 mounted on the central upwardly projecting stem 51 of a horizontal eye piece 52 which is mounted to swivel laterally on a substantially horizontal tube 53 fixed longitudinally to brackets 54, 55, on the underside of the framework of the machine, or on the underside of the motor casing. On the stem 51 of the eye piece 52 there is a spring 56 in compression against which the central eye part 50 of the cross axle 49 bears and which thus supports the weight of the fore part of the machine, and the eye piece 52 also swivels on the bottom tube 53 and allows one of the front road wheels 47, 48, to rise higher than the other when necessary owing to the unevenness of the ground.

The steering axle 49 is controlled by ordinary steering gear.

In the arrangement of our invention illustrated by Figs. 3, 4, 5, 6, and 7 the motor tractor has no framework but the casing 35× of the transmission gear is rigidly fixed to the casing 4× of the motor so as to thereby with said motor casing form one rigid unit, the transmission gear casing 35× having strong laterally projecting bosses, 33, 34, on which the radial arms 58, 59, carrying the stub axles 9, 10, are pivoted and turn. Each of these radial arms 58, 59, is made at one end with a long eye part 60 fitting and turning on the boss 33, or 34 and at the outer end 61 is preferably forked as shown with an eyed member 62 for the spring mounted between the sides of the fork and joined thereto by a sleeve or bushing 63 forming the bearing for the stub axle and passing through the forked ends and through the member 62. This eyed member 62 corresponds with the rearwardly projecting eye parts 41 in the arrangement hereinbefore described and illustrated by Figs. 1 and 2. The compression springs 40, 42 are arranged respectively above and below this eyed member 62 and the connection bolt 43 passes through a hole in this eyed member 62, the lower ends 68 of the bolts 43 engaging in holes in the brackets 64 which are cast or fixed to the sides of the transmission gear casing 35×, the holes in these brackets 64 being made large enough to permit of the bolts 43 swiveling to accommodate themselves to the movement of the radial arms and eyed member 62. The locking bolts 45 which pass through holes in the eyed member 62 and are furnished with nuts as aforesaid in order to lock the radial arms and the stub axles to the transmission gear casing 35× when the springs are required to be inoperative, are at their lower ends jointed to pins 65 fixed to bosses on the sides of the transmission gear casing 35×, so that when out of use the locking bolts 45 can be turned on these pins to hang down, the bolt holes in the eyed member 62 being slotted to permit of this.

When we provide means for temporarily setting one road wheel and its adjuncts higher than the other road wheel and its adjuncts, such means must be so arranged as not to interfere with the springing of the radial arms and their stub axles and the road wheels carried thereby. A convenient arrangement for this purpose is illustrated by Fig. 8 where the same compression springs 40, 42, are employed and situated respectively above and below the eyed member 62, but in this case a tubular bolt 43× takes the places of the bolt 43 in Figs. 3, 6, and 7. The washer 75 is fixed on the bottom of this tube 43× for the lower spring 42 to bear against. The interior of the lower part of the tube 43× is tapped and working in this is an adjusting screw 76 which passes through a slotted hole in the projecting lug 64× on the side of the transmission gear casing 35 and fixed on the adjusting screw 76 below the lug 64× there is a hand wheel 77 for turning said screw, which is furnished with an integral collar 78 to bear on the top of the lug 64×. By turning this hand wheel 77 in one or the other direction the radial arm 58 together with the stub axle 9 and road wheel 13 and the eyed member 62 and the tube 43× and the compression springs can be raised and lowered relatively to the transverse transmission shaft 8 and transmission gear casing 35 so as to set one road wheel higher than the other when desired and when the desired height has been attained the adjusting screw 76 can be locked by any convenient means.

The horizontal tube 53 which carries the eye piece 50 of the steering axle is fixed in bracket parts 54, 55 bolted or otherwise fixed to or formed with the underside of the motor casing 4×. Also the draw bar 3× at the rear of the machine is fixed to the back of the casing 35× of the transmission gear which also carries the driver's seat arm 66.

In this arrangement of our invention the pinions on the transmission shaft together with the gear wheels on the stub axles 9, 10, may be mounted and arranged inside or outside the casing of the transmission gear but preferably inside the same so as to thereby be inclosed from dust and dirt, and this necessitates the stub axles 9, 10, on which the road wheels 13, 14, in this case are fixed, to be so mounted as to revolve as aforesaid in bearings in the sleeves or bushing 63 of the radial arms 58, 59, instead of being rigidly fixed in the outer ends of the radial arms as in the arrangement first above described and illustrated by Figs. 1 and 2.

As in the arrangement above described and illustrated by Figs. 1 and 2 any suitable transmission gear may be employed between the engine central shaft 15 and the transverse transmission shaft such gear for instance may be employed as indicated in Fig. 6 comprising a pair of bevel wheels 19, 20 of which the wheel 19 is fixed on the central shaft 15 and the wheel 20 is fixed on the transverse counter shaft 21 on which latter there are fixed the two spur pinions 22, 23, adapted to gear respectively with the intermediate idle wheels 24, 25, which gear with the spur wheels 26, 27, mounted on the transverse shaft 8 which latter is preferably divided at the center into two parts connected together by differential gearing indicated at 30 so that these two parts of the transmission shaft 8 on which are respectively fixed the two pinions 31', 32' can turn independently of one another in the usual way, as when the tractor is running in a curved track. The pinions 22, 23, are formed on a sleeve on the transverse counter shaft 21 and adapted for endwise movements so that either the pinion 23 can be brought into gear with the wheels 24, 26, for the slow speed or the pinions 22, 23, can be slid along the shaft to bring the pinion 23 out of gear and the other pinion 22 into gear with the idle wheel 25 which gears with the spur wheel 27 to give a fast drive.

67 is a driving pulley mounted on the counter shaft 21 for the purpose of driving any shafting or machine by the tractor motor.

It will be evident that our said means for carrying and springing the driven road wheels can be similarly applied to other motor tractors such for instance as tractors which run only on the two driven road wheels, or to that type in which the two front wheels are driven or in which idle wheels are driven.

It will be understood that this invention is applicable to motor tractors furnished with any of the well known methods of disposing the engine and transmission gear.

The slotted holes 69 in the sides of the transmission gear casing 35× through which the stub axles 9, 10, pass have to be arc shaped struck from the center of the transmission shaft 8 and in order to prevent dust and dirt entering the casing 35× through these openings and also to prevent leakage of oil therethrough, a shield plate such as 70 Figs. 4 and 5 has to be provided for each opening and preferably on the inside of the casing. This shield plate has a circular hole 71 to fit the stub axle and moves up and down therewith and to allow of these movements the cover plates are secured to the ends of the casing by bolts 72 passing through slots 73, 74 of the cover plate.

What we claim as our invention and desire to secure by Letters Patent is:—

1. In a tractor of the class described, the combination of a frame including side members having their front and rear ends in different horizontal planes, a transmission shaft journaled on said frame in a horizontal plane above the front ends of said side members, a pair of radial arms independently pivoted on said transmission shaft and adapted to extend below the axial center of said shaft, a stub axle carried by each of said arms, a wheel mounted for rotation on each of said axles, and driving means between said transmission shaft and said wheels.

2. In a tractor of the class described, the combination of a frame including side members having their front and rear ends in different horizontal planes, a transmission shaft journaled on said side members in a horizontal plane above the front ends of said side members, a pair of radial arms independently pivoted on said transmission shaft, and adapted to extend below the axial center of said shaft, a stub axle carried by each of said arms, a wheel mounted for rotation on each of said axles, driving means between said transmission shaft and said wheels, and means for preventing pivotal movement of said arms.

3. In a tractor of the class described, the combination of a frame including side members having their front and rear ends in different horizontal planes, a transmission shaft journaled on said side members in a horizontal plane above the front ends of the side members, a pair of radial arms independently pivoted on said transmission shaft and adapted to extend below the axial center of said shaft, a stub axle carried by each of said arms, a wheel mounted for rotation on each of said axles, driving means between said transmission shaft and said wheel, and a bolt for each of said arms pivotally connected with one of the side members and adapted to be secured to said arm for preventing pivotal movement of the arm.

4. The combination with a tractor constructed as set forth in claim 1, of means for preventing pivotal movement of said arms, means for independently adjusting the height of the wheels with relation to the frame, and cushioning means secured to the frame and adapted to exert pressure on the free end of each of said arms.

In testimony whereof we have signed our names to this specification.

JOSEPH BAMFORD.
CYRIL JOSEPH BAMFORD.